(12) United States Patent
Yap et al.

(10) Patent No.: US 6,616,743 B1
(45) Date of Patent: Sep. 9, 2003

(54) AQUEOUS EMULSIONS, WITH BENTONITE FOR COLD APPLICATION BITUMEN

(75) Inventors: Michael L. Yap, Oldsmar, FL (US); Raymond T. Hyer, Tampa, FL (US); Barton J. Malina, Tampa, FL (US)

(73) Assignee: Gardner Asphalt Corporation, Tampa, FL (US)

( * ) Notice: Subject to any disclaimer, the term of this patent is extended or adjusted under 35 U.S.C. 154(b) by 0 days.

(21) Appl. No.: 09/887,383

(22) Filed: Jun. 22, 2001

(51) Int. Cl.⁷ .............................................. C09D 195/00
(52) U.S. Cl. ....................................... 106/277; 507/126
(58) Field of Search ........................... 106/277; 507/126

(56) References Cited

U.S. PATENT DOCUMENTS

| | | | | |
|---|---|---|---|---|
| 4,279,547 A | | 7/1981 | Clem | 405/208 |
| 4,404,108 A | * | 9/1983 | Cates | 507/106 |
| 5,368,692 A | | 11/1994 | Derrick | 162/181.8 |
| 5,840,105 A | | 11/1998 | Helmstetter | 106/18.12 |
| 5,860,772 A | | 1/1999 | Starita et al. | 405/270 |
| 5,970,893 A | | 10/1999 | Starita et al. | 112/2 |
| 6,019,830 A | * | 2/2000 | Yap et al. | 106/277 |

* cited by examiner

*Primary Examiner*—David Brunsman
(74) *Attorney, Agent, or Firm*—Holland & Knight LLP

(57) ABSTRACT

Compositions of an aqueous emulsion of a bitumen and a drilling mud bentonite are especially adapted for cold application and provide many advantages.

4 Claims, No Drawings

AQUEOUS EMULSIONS, WITH BENTONITE FOR COLD APPLICATION BITUMEN

BACKGROUND OF THE INVENTION

1. Field of the Invention

The use of bitumens (i.e., asphalt and cold tar) for roofing and other applications is well known. The advantage of cold applicability, e.g. on flat roofs so as to avoid working with a hot material at a job site is also well known. It is desirable to achieve improved formulations to increase the economy of the effort and improve the properties of the treated materials.

2. Description of the Background Art

U.S. Pat. No. 5,840,105 discloses the use of bentonite from drilling muds for sodium silicate and fine mica coatings. U.S. Pat. No. 5,970,893 discloses clay liners as barriers for the containment of pollutants or toxic waste.

SUMMARY OF THE INVENTION

It has now been found that aqueous emulsions of specific drilling mud bentonite with bitumen provide formulations that have markedly decreased costs and markedly improved properties for cold application. It is surprising to find that this specialty bentonite provides such superior results outside the petroleum drilling mud field.

DETAILED DESCRIPTION OF THE PREFERRED EMBODIMENT

The drilling bentonite mud conform to American Petroleum Institute (API) specification 13A which yield approximately 120 to 280 barrels of 15 centiposes mud per ton, preferably about 180 to 240 barrels per ton. Typical bentonites with their trademarks Hydraul-EZ; KWIK-THIK and Super-Gel-X.

Asphalt is a bitumen derived from a number of materials such as, for example, petroleum, shale oil, gilsonite and the like. Asphalt is a thick, viscous mixture of compounds such as, for example, paraffinic, cycloaliphatic and aromatic hydrocarbon and lesser amounts of heterocylic compound containing sulfur, nitrogen or oxygen. Although asphalt can be obtained from natural sources, it is primarily derived as the residue of petroleum distillation (e.g., the bottom product of a vacuum distillation of a topped crude). Although this invention is not limited thereto, it is preferred that the asphalt have a penetration (ASTM D5) at 77 degrees F. dmm: ranging from about 5 to about 300 dmm and more preferably from about 50 to about 200 dmm and conform in general to specification outlined by ASTM D312, D946 and/or D449.

The asphalt can be utilized in the form of an aqueous emulsion readily available in the trade, see ASTM D1227, and thus has a water content of about 40–60 wt.%.

Coal tar is a bitumen derived from crude coal tar, water gas tar, oil gas tar or from combination of such tars with their constituents. Coal tar is a black, viscous, naphthalene-like odor, amorphous residue mainly from distillation of coal. The majority of its composition is polynuclear aromatic compounds such a aromatic hydrocarbon, naphthalenic, phenolic, anthracenic, quinolinic compound with trace of insoluble materials. Different grades have different float tests and softening points. Although this invention is not constrained to, the preferred coal tars have a float test at 122 degrees F., seconds: ranging from about 75 to bout 230 seconds and more preferably from about 180 to 220 seconds and conform in general to specification outlined by RT-10 (Road tar-10) RT-11 and RT-12 in ASTM D490.

The coal tar can be utilized in the form of an aqueous emulsion readily available in the trade (see Federal Specification RP 355e) and thus has a maximum water content of about 53 wt. %.

At least one of asphalt and coal tar are employed, depending on desired final product.

Subject to the foregoing, the ranges of components are about:

|  | wt. % of Emulsion |
|---|---|
| Bitumen | 5–50 |
| Asphalt and/or Coal tar | 5–50 |
| Drilling Mud Bentonite | 3–8 |
| Water | 15–55 |
| Specialty Additives | 0.1–2 |

The specialty additives include e.g. mineral salt to increase emulsability; complex organic acids such as acetic acid etc. to bring the pH to a range of 4–6, also to enhance emulsability, and polymers singly or in combination for a similar purpose, e.g. acrylic, vinyl polystyrene, etc.

Inert fillers such as pulverized limestone powder, talc, perlite, etc., can be used in an amount of about 0 to 50, wt. %.

Inert fibers such as cellulosic, asbestos, fiberglass, polyolefin, etc. can be used in an amount of from about 0–25 wt. %.

It should be noted that the amount of water listed above is in addition to that derived from asphalt and cold tar aqueous emulsions employed.

The process of producing the aqueous emulsified bitumens are as follows:

1. 3%–5% bentonite is added into water in the mixer. When dispersed after mixing, it turns into a slurry. The slurry temperature between 60–120 degrees Fahrenheit is preferred.
2. The bitumens (asphalt coal tar or both) are heated to 250–350 degree Fahrenheit.
3. The slurry and bitumen is then combined into a mixture of emulsified bitumen through process such as dispersing type (batch to batch) or colloid mill type (continuous) system.

The specifications of emulsified asphalt meet ASTM D 1227, Standard Specification for Emulsified Asphalt Used as Protective Coating for Roofing. The Specifications of emulsified coal tar meets ASTM D 5727 Standard Specification for Emulsified Refined Coal Tar and ASTM D3320 Standard Specification for Emulsified Coal-Tar Pitch.

This invention will be better understood by reference to the following examples:

EXAMPLE 1

The Preparation of Emulsified Asphalt Using Bentonite Slurry With AC-250 Type Asphalt

|  | % By weight |
|---|---|
| Water | 51.0 |
| Drilling Mud Bentonite | 1.5–2.5 |
| AC-20 Asphalt (115 deg. F. melting point) | 46.3–47.3 |
| Ph Adjuster | 0.2 |
|  | 100.0 |

EXAMPLE 2

The Preparation of Emulsified Asphalt Using Bentonite Slurry With PPA Hard Asphalt.

|  | % By weight |
|---|---|
| Water | 51.0 |
| Drilling Mud Bentonite Slurry | 2.5–3.5 |
| Hard PPA Asphalt (185 deg. F. melting point) | 45.3–46.3 |
| Ph Adjuster | 0.2 |
|  | 100.0 |

EXAMPLE 3

Preparation of Emulsified Coal Tar Using Bentonite Slurry.

|  | % By weight |
|---|---|
| Water | 52.0 |
| Drilling Mud Bentonite | 7.0 |
| Coal Tar | 41.0 |
|  | 100.0 |

EXAMPLE 4

Preparation of Emulsified Asphalt Using Polymer(s) Added Asphalt and Bentonite Slurry.

|  | % By weight |
|---|---|
| Water | 52.0 |
| Drilling Mud Bentonite | 2.5–3.5 |
| Asphalt with Polymer(s) | 44.3–45.3 |
| Ph Adjusters | 0.2 |
|  | 100.0 |

The following examples employ the drilling mud bentonite and bitumen of preceding examples.

EXAMPLE 5

Asphalt Emulsion Roofing Composition.

|  | % By weight |
|---|---|
| Example 1 or 2 | 20–60 |
| Reinforced Fibers | 0.5–10 |
| Fillers/Extenders | 1.0–20 |
| Water | 0.0–20 |
| Specialty Additives | 0.1–10 |

EXAMPLE 6

Asphalt Emulsion Reflective Aluminum Composition

|  | % By weight |
|---|---|
| Example 1, 2 or 3 | 20–60 |
| Special treated aluminum paste | 5–15 |
| Fillers/Extenders | 2–20 |
| Water | 3–20 |
| Specialty additives | 0.2–5 |

EXAMPLE 7

Bituminous Black Top Driveway Sealers

|  | % By weight |
|---|---|
| Example 1 to 4 | 15–50 |
| Fillers/Extenders | 2–20 |
| Sand | 0.5–20 |
| Water | 10–40 |
| Specialty Additives | 0.2–5 |

EXAMPLE 8

Bituminous Patching Compound

|  | % By weight |
|---|---|
| Example 1 to 4 | 50–80 |
| Fillers/Extenders | 5–15 |
| Fibers | 1–5 |
| Water | 1–10 |
| Specialty Additives | 0.2–2.0 |

EXAMPLE 9

Bituminous Bonding Adhesives

|  | % By weight |
|---|---|
| Example 1 to 4 | 30–60 |
| Adhesive Enhancer Polymer Resins | 1–20 |
| Water | 1–10 |
| Fillers/Extenders | 2–10 |

-continued

| | % By weight |
|---|---|
| Fibers | 0.5–5 |
| Specialty Additives | 0.2–5 |

EXAMPLE 10

Bituminous Roof Mastic

| | % By weight |
|---|---|
| Example 1 to 4 | 40–70 |
| Bituminous Cutback Solvent | 0–30 |
| Fillers/Extenders | 2–20 |
| Specialty Additives | 0.5–30 |

EXAMPLE 11

Bituminous Waterproofer or Vapor Barriers

| | % By weight |
|---|---|
| Example 1 to 4 | 70–90 |
| Wax Emulsion | 0–15 |
| Silicon Emulsion | 0–15 |
| Water | 0–10 |
| Specialty Additives | 0.1–5 |

EXAMPLE 12

Primer/Weed Controller/Road Dust Suppressor

| | % By weight |
|---|---|
| Example 1 to 4 | 10–50 |
| Water | 10–60 |
| Surface Active Additives | 0.3–3 |
| Specialty Additives | 0.1–6 |

The advantages of this invention will be apparent to the skilled in the art higher solids emulsions, higher melt point when using harder asphalts; no coalescing solvent needed despite high glass transition temperature; no water sensitive surface active agents needed; superior binding and wetting of pigments; fibers and fillers; non porous; harder films; no setting or separation in package; excellent wetting of substrate and adhesion to old substrates; easier more uniform application due to their thixotropic nature; fast dry; superior color wetness); superior hydrophobic nature, superior abrasion resistance; superior "track" resistance (less softening when hot); much longer useful life and weather resistance; presents good sealed surface for recoat when necessary.

For economy of operation and ease of use, the compositions are transported and usually marketed as concentrates. They can then be diluted with other materials for related applications. The methods of application are well-known and need not be elaborated here.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A colloidal aqueous emulsion of a bitumen and a drilling mud bentonite composition especially adapted for cold application, wherein the drilling mud bentonite conforms to API specification 13A.

2. The emulsion of claim 1 in which the bentonite yields about 180 to 240 barrels per ton.

3. The emulsion of claim 2 in which the bitumen is at least one of asphalt or coal tar.

4. The emulsion of claim 3 in which the range of components are about:

| | Wt. % of Emulsion |
|---|---|
| Bitumen | 5–50 |
| Bentonite | 3–80 |
| Water | 15–55 |
| Specialty Additives | 0.1–2. |

* * * * *

UNITED STATES PATENT AND TRADEMARK OFFICE
CERTIFICATE OF CORRECTION

PATENT NO. : 6,616,743 B1 Page 1 of 1
DATED : September 9, 2003
INVENTOR(S) : Michael L. Yap et al.

It is certified that error appears in the above-identified patent and that said Letters Patent is hereby corrected as shown below:

Column 1,
Line 8, delete "(i.e., asphalt and cold tar)" and insert -- (i.e., asphalt and coal tar) --.
Line 31, delete "conform" and insert -- conforms --.
Line 32, delete "yield" and insert -- yields --.
Line 66, delete "to bout 230" and insert -- to about 230 --.

Column 2,
Line 20, delete "Bitumen" and insert -- Bitumen (Asphalt and/or Coal Tar) --.
Line 21, delete "Asphalt and/or Coal tar   5-50".
Line 22, delete "3-8" and insert -- 3-80 --.
Line 43, delete "and cold tar" and insert -- and/or coal tar --.
Line 53, delete "bitumens (asphalt coal tar or both)" and insert -- bitument (asphalt, coal tar or both) --.

Column 3,
Line 5, delete "AC-250" and insert -- AC-20 --.

Column 5,
Line 31, delete "Silicon" and insert -- Silicone --.

Column 6,
Line 7, delete "color wetness" and insert -- color jetness --.

Signed and Sealed this

Sixth Day of January, 2004

JAMES E. ROGAN
*Director of the United States Patent and Trademark Office*